(12) United States Patent
Tan

(10) Patent No.: US 10,924,873 B2
(45) Date of Patent: Feb. 16, 2021

(54) LIGHTING DEVICE WITH AUXILIARY MICROPHONES

(71) Applicant: SIGNIFY HOLDING B.V., Eindhoven (NL)

(72) Inventor: Pengseng Tan, Peachtree City, GA (US)

(73) Assignee: SIGNIFY HOLDING B.V., Eindhoven (NL)

(*) Notice: Subject to any disclaimer, the term of this patent is extended or adjusted under 35 U.S.C. 154(b) by 0 days.

(21) Appl. No.: 16/419,966

(22) Filed: May 22, 2019

(65) Prior Publication Data

US 2019/0373386 A1 Dec. 5, 2019

Related U.S. Application Data

(60) Provisional application No. 62/678,116, filed on May 30, 2018.

(51) Int. Cl.
*H04R 29/00* (2006.01)
*H04R 3/00* (2006.01)
*H05B 47/12* (2020.01)

(52) U.S. Cl.
CPC ............. *H04R 29/005* (2013.01); *H04R 3/00* (2013.01); *H05B 47/12* (2020.01)

(58) Field of Classification Search
CPC ........ H04R 29/005; H04R 3/00; H04R 29/00; H04R 29/006
USPC .............................. 381/55, 56, 91–92, 58–59
See application file for complete search history.

(56) References Cited

U.S. PATENT DOCUMENTS

| 8,929,564 | B2* | 1/2015 | Kikkeri | G10L 21/0216 |
| | | | | 381/92 |
| 9,699,550 | B2* | 7/2017 | Fitzgerald | G06F 1/325 |
| 10,595,125 | B2* | 3/2020 | Takayama | H04R 29/00 |
| 2012/0269356 | A1* | 10/2012 | Sheerin | H04R 29/004 |
| | | | | 381/58 |
| 2014/0278435 | A1* | 9/2014 | Ganong, III | G10L 15/22 |
| | | | | 704/275 |
| 2018/0170749 | A1* | 6/2018 | Boyd | B81C 99/004 |

* cited by examiner

*Primary Examiner* — Disler Paul
(74) *Attorney, Agent, or Firm* — Patrick T. Driscoll

(57) ABSTRACT

A method of configuring lighting fixture microphones includes receiving, by a processor circuit, an electrical audio signal from a first microphone. The method further includes determining, by the processor circuit, whether the first microphone is defective based on the electrical audio signal. The method also includes enabling, by the processor circuit, a second microphone in response to determining that the first microphone is defective.

13 Claims, 7 Drawing Sheets

LIGHTING DEVICE WITH AUXILIARY MICROPHONES

CROSS REFERENCE TO RELATED APPLICATIONS

The present application claims priority under 35 U.S.C. Section 119(e) to U.S. Provisional Patent Application No. 62/678,116, filed May 30, 2018 and titled "Lighting Device With Auxiliary Microphones," the entire content of which is incorporated herein by reference.

TECHNICAL FIELD

The present disclosure relates generally to lighting-related solutions, and more particularly to integrated lighting and auxiliary microphones.

BACKGROUND

Some products have integrated microphones. One or more microphones that are integrated in a product allow for voice-enabled operations based on voice commands received via the microphone(s). An integrated microphone that fails to operate properly may be repaired or replaced when practical. When it is not practical to repair or replace a defective microphone that is integrated into a product, the product may need to be discarded/replaced, particularly when the microphone is critical to the operation of the product. In some cases, repairing or replacing a defective integrated microphone may be challenging and/or too expensive even when possible. Further, replacing a product because of a defective microphone may be too costly. Thus, a solution that reduces the need for repair and substitution of integrated microphones and entire products may be desirable.

SUMMARY

The present disclosure relates generally to lighting-related solutions, and more particularly to integrated lighting and auxiliary microphones. In some example embodiments, a method of configuring lighting fixture microphones includes receiving, by a processor circuit, an electrical audio signal from a first microphone. The method further includes determining, by the processor circuit, whether the first microphone is defective based on the electrical audio signal. The method also includes enabling, by the processor circuit, a second microphone in response to determining that the first microphone is defective.

In another example embodiment, a lighting fixture comprises a light source that provides an illumination light, multiple microphones, and a processor circuit configured to control operations of the light source. The processor circuit is further configured to determine whether a first microphone of the multiple microphones is defective and to enable the second microphone of the multiple microphones in response to determining that the first microphone is defective.

In another example embodiment, a method of configuring microphones of a lighting fixture includes receiving, by the microphones of the lighting fixture, a sound. The method further includes identifying, by a processor circuit of the lighting fixture, based on electrical audio signals generated by the microphones of the lighting fixture from the sound, first one or more microphones of the microphones that provide a better audio performance than second one or more microphones of the microphones of the lighting fixture. The method also includes enabling, by the processor circuit, the first one or more microphones of the multiple microphones.

These and other aspects, objects, features, and embodiments will be apparent from the following description and the appended claims.

BRIEF DESCRIPTION OF THE FIGURES

Reference will now be made to the accompanying drawings, which are not necessarily drawn to scale, and wherein.

Figure 1:
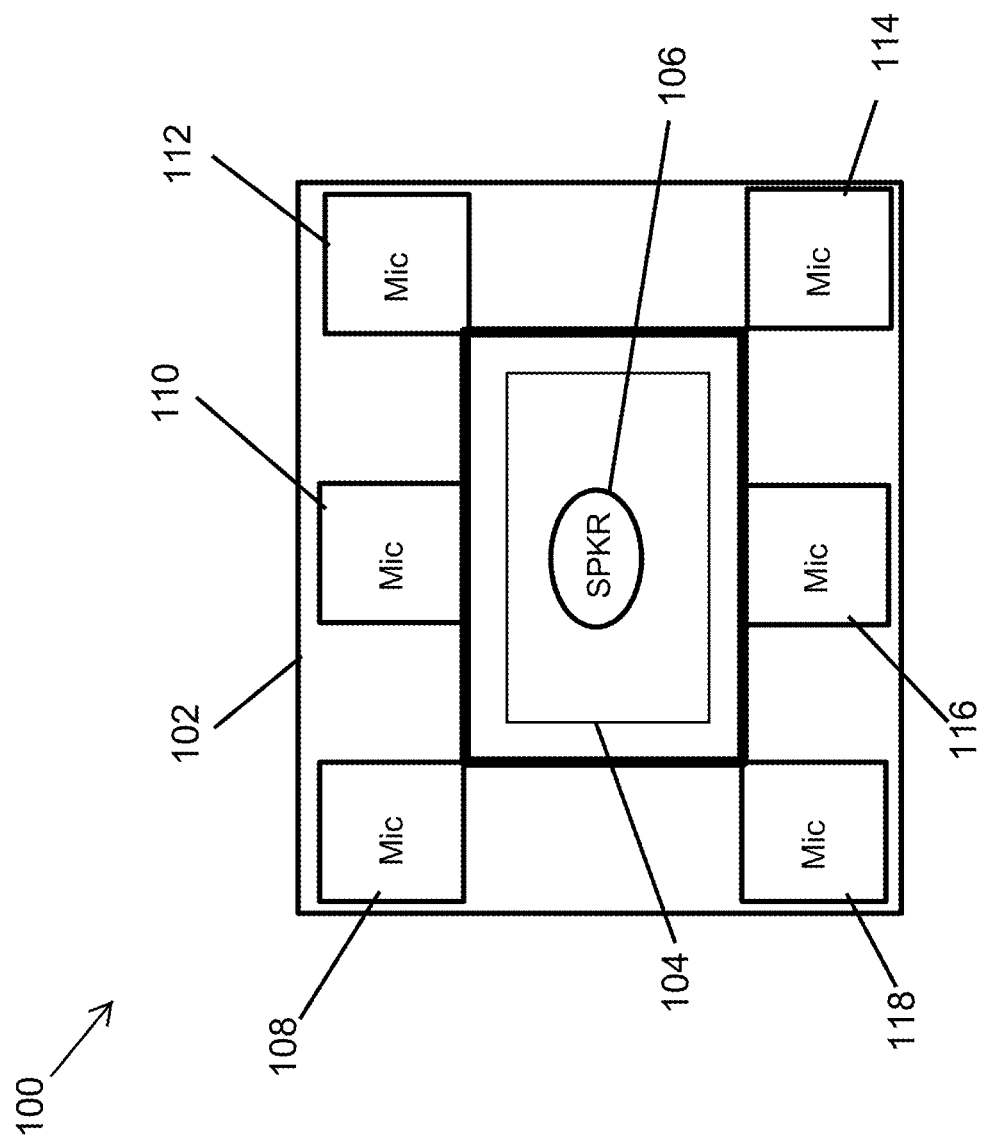
FIG. 1 illustrates a lighting fixture with integrated microphones according to an example embodiment.

The drawings illustrate only example embodiments and are therefore not to be considered limiting in scope. The elements and features shown in the drawings are not necessarily to scale, emphasis instead being placed upon clearly illustrating the principles of the example embodiments. Additionally, certain dimensions or placements may be exaggerated to help visually convey such principles. In the drawings, the same reference numerals used in different figures may designate like or corresponding but not necessarily identical elements.

DETAILED DESCRIPTION OF THE EXAMPLE EMBODIMENTS

In the following paragraphs, example embodiments will be described in further detail with reference to the figures. In the description, well known components, methods, and/or processing techniques are omitted or briefly described. Furthermore, reference to various feature(s) of the embodiments is not to suggest that all embodiments must include the referenced feature(s).

FIG. 1 illustrates a lighting fixture 100 with integrated microphones according to an example embodiment. In some example embodiments, the lighting fixture 100 includes a housing 102 and a light source 104 (e.g., an LED light source) that provides illumination light to illuminate an area. The lighting fixture 100 may also include a speaker 106 and microphones 108-118. The lighting fixture 100 may be controlled using voice commands that are received by one or more of the microphones 108-118. For example, the illumination light provided by the lighting fixture 100 may be turned on, turned off, dimmed, etc. based on voice commands received by the lighting fixture 100 via the one or more of the microphones 108-118. The lighting fixture 100 may also receive voice commands, audio messages, and other sounds via one or more of the microphones 108-118 and transmit the information contained in the received voice commands, etc., to another device, such as an appliance, another lighting fixture, a local server, a cloud server, etc.

In some example embodiments, the lighting fixture 100 may include a wired and/or wireless transceiver that can receive and transmit signals. Alternatively or in addition, the lighting fixture 100 may include a wired and/or wireless receiver and transmitter. The lighting fixture 100 may also include a controller (e.g., a microprocessor or a microcontroller) that processes information (e.g., commands and messages) that are received by one or more of the microphones 108-118 and by the transceiver.

In some example embodiments, the speaker 106 may be used to provide an audio notification related or unrelated to the lighting fixture 100. The speaker 106 may also be used to provide an audio response, status information, etc. For example, the lighting fixture 100 may provide through the speaker 106 an audio response to a voice command received by one or more of the microphones 108-118. The lighting fixture 100 may also provide through the speaker 106 status information (e.g., on, off, etc.) related to the lighting fixture 100.

In some example embodiments, one or more of the microphones 108-118 may be used or enabled at one particular time to receive sound (e.g., voice commands, etc.), and the remaining one or more of the microphones 108-118 may be disabled. For example, some of the microphones 108-118 may be auxiliary microphones that are typically disabled but that may be enabled when needed.

In some example embodiments, some of the microphones 108-118 may be enabled, and the remaining ones of the microphones 108-118 may be disabled by default or as a result of a prior calibration process. For example, the microphone 108 may be enabled, and the microphones 110-118 may be disabled. As another example, the microphones 110, 116 may be enabled, and the microphones 108, 112, 114, 118 may be disabled. As yet another example, the microphones 108, 112, 116 may be enabled, and the microphones 110, 114, 118 may be disabled. Each microphone of the microphones 108-118 may be enabled by providing power to the particular microphone or to a component (e.g., a pre-amplifier) coupled to the particular microphone. Each microphone may be disabled by disconnecting/removing power from the particular microphone or from a component (e.g., a pre-amplifier) coupled to the particular microphone. To illustrate, one or more of the microphones 108-118 may include a respective pre-amplifier. One or more of the microphones 108-118 may also be a digital microphone.

In some example embodiments, some of the microphones 108-118 may be enabled by default, and the remaining ones of the microphones 108-118 may be disabled. For example, during manufacturing or installation, the lighting fixture 100 may be programmed or otherwise configured to enable some of the microphones 108-118 and to disable the remaining ones of the microphones 108-118. To illustrate, a controller of the lighting fixture 100 may be configured to enable the microphones 108, 112 and to disable the microphones 110 and 114-118 as a default selection.

In some example embodiments, the particular microphones of the lighting fixture 100 that are enabled may be changed. For example, after installation, the lighting fixture 100 may enable one or more microphones from among the microphones 108-118 that were disabled, and the lighting fixture 100 may disable one or more microphones from among the microphones 108-118 that were enabled. For example, the lighting fixture 100 may change the particular microphones of the microphones 108-118 that are enabled and/or disabled in response to a user input.

In some example embodiments, the lighting fixture 100 may determine whether one or more enabled microphones from among the microphones 108-118 are defective. For example, the lighting fixture 100 may identify defective microphones from among the microphones 108-118 based on a sound that is output by the speaker 106 as described in more detail below. In response to determining that a particular enabled microphone is defective, the lighting fixture 100 may disable the particular microphone. To illustrate, the microphone 108 may be previously enabled (e.g., by default), and the lighting fixture 100 may determine whether the microphone 108 is defective based on one or more requirements. For example, the lighting fixture 100 may determine that the microphone 108 is below a particular performance level (i.e., defective) based on a maximum voltage level or an average voltage level of an audio signal received from the microphone 108. In response to determining that the microphone 108 is defective, the lighting fixture 100 may disable the microphone 108, for example, by cutting off power to the microphone 108 or from a component (e.g., pre-amplifier) coupled to the microphone 108.

In some example embodiments, the lighting fixture 100 may enable a microphone that was previously disabled/not-enabled as a substitution for a defective microphone. For example, the lighting fixture 100 may enable one of the microphones 110-118 after determining that the microphone 108 is defective. To illustrate, the lighting fixture 100 may enable the microphone 112 as a substitute microphone for the microphone 108, which the lighting fixture 100 may disable after determining that the microphone 108 is defective. In some alternative embodiments, the lighting fixture 100 may enable a disabled one of the microphones 110-118 without disabling the microphone 108. After enabling the microphone 112, the lighting fixture 100 may determine whether the microphone 112 is defective. If the microphone 112 is defective, the lighting fixture 100 may disable the microphone 112 and enable another one of the microphones 114-118. The lighting fixture 100 may continue the process until the lighting fixture 100 determines that an enabled microphone meets a performance requirement.

In some example embodiments, in response to determining that the microphone 108 is defective, the lighting fixture 100 may disable the microphone 108 as well as another one or more of the microphones 110-118. For example, the microphones 108-118 may be grouped into sets of two or more microphones, and microphones in a single set may be enabled or disabled together. To illustrate, the microphone 110 may be in the same set/group with the microphone 108, and the lighting fixture 100 may disable the microphone 108 as well as the microphone 112 in response to determining that the microphone 108 is defective. In some example embodiments, the lighting fixture 100 may enable multiple microphones in response to determining that an enabled microphone is defective. For example, the lighting fixture 100 may enable the microphones 114, 118 as substitute microphones for the microphones 108, 112.

In some example embodiments, the lighting fixture 100 may consider the physical separation between two microphones before determining whether to enable both microphones for simultaneous operation. For example, some of the microphones 108-118 may not meet a minimum separation requirement (e.g., half a wavelength of an audio signal) from another microphone one of the microphones 108-118 based on the locations of the microphones 108-118 on the lighting fixture 100. Those microphones among the microphones 108-118 that do not meet the minimum separation requirement from each other may not be enabled to be operational at the same time. For example, if the microphone 112 is enabled along with the microphone 108 and if the microphone 110 is too close to the microphone 112 to meet the minimum separation requirement, the lighting fixture 100 may not enable the microphone 110 as a substitution for the microphone 108 so that the microphones 110 and 112 are not enabled or used at the same time. The lighting fixture 100 may instead enable another microphone (e.g., the microphone 114) that is adequately separated from the microphone 112.

In some example embodiments, information indicating the particular microphones among the microphones 108-118 that can be operational at the same time may be provided to the lighting fixture 100. For example, such information may be provided to the lighting fixture 100 during manufacturing, installation, or after installation of the lighting fixture 100. In some example embodiments, the microphones 108-118 are grouped into groups/sets of one or more microphones, and the lighting fixture 100 may be configured with microphone group/set information, where microphones that are in the same group can be operational at the same time. To illustrate, the microphones 108-118 that can be operational at the same time may be indicated to the lighting fixture 100 using group/set information. For example, if one microphone in a set of two microphones is defective, the lighting fixture 100 may disable both microphones in the group and enable two or more microphones that are in another group.

In some example embodiments, the microphones 108-118 are grouped into sets of one or more microphones, where the microphone(s) in one of the sets is/are enabled as a set and the microphones in the remaining sets are disabled as sets. To illustrate, one set of microphone(s) may be selected from the sets of microphones based on the combined performance of the microphone(s) in each set. For example, a set of one or more microphones among the microphones 108-118 that provide the best combined performance may be identified and enabled, and microphones in the remaining sets may be disabled. In some example embodiments, the microphones 108-118 may be grouped into different sets of one or more microphone(s) during manufacturing/assembly or during or after installation, for example, based on the location of the microphones 108-118 on the lighting fixture 100.

In some example embodiments, the detection of defective microphones from among the microphones 108-118 and the enabling of substitution microphones from among the microphones 108-118 may be initiated by a user (e.g., an installer or an occupant). For example, a user may send to the lighting fixture 100, wirelessly or via a wired connection, a command to initiate a calibration process that includes detection and, if necessary, substitution of defective microphones among the microphones 108-118. A user may also initiate a calibration process to identify and enable one or more microphones among the microphones 108-118 that provide the best performance and disable the remaining microphones even when none of the enabled microphones are defective. For example, a user may initiate a calibration process immediately following the installation of the lighting fixture 100 or at a later time during the life of the lighting fixture 100.

In some example embodiments, a calibration process may include the detection of defective microphones from among the microphones 108-118 followed by the identification of the best performing set of microphones from among the microphones 108-118. For example, after the detection of defective microphones is performed, the identification of the best performing set of microphones may be performed for sets of microphones that do not include a defective microphone. Alternatively or in addition, the detection of defective microphones may be performed in a calibration process separate from the identification of the best performing set of microphones. To illustrate, the detection of defective microphone(s) from among the microphones 108-118 and the substitution of the defective microphone(s) by one or more microphones from among the microphones 108-118 may be performed in response to one calibration command provided to the lighting fixture 100, and the identification and enabling of the best performing set of microphones from among the microphones 108-118 and the disabling of the remaining sets of microphones from among the microphones 108-118 may be performed in response to another calibration command provided to the lighting fixture 100.

Because integrated auxiliary microphones can be used as functional replacements for defective microphones, identifying and disabling defective microphones and enabling replacement microphones can eliminate the need for physically changing defective microphones or the need to replace the lighting fixture 100. Further, by providing integrated auxiliary microphones, one or more microphones that provide the best audio performance may be enabled throughout the life of the lighting fixture, for example, by performing calibrations at different times. The ability to obtain or maintain high quality audio performance may eliminate the need to physically replace defective or deficient microphones or lighting fixture 100.

In some alternative embodiments, the lighting fixture 100 may include more or fewer microphones than shown without departing from the scope of this disclosure. In some alternative embodiments, the microphones 108-118, the light source 104, and/or the speaker 106 may be at different locations than shown in FIG. 1 without departing from the scope of this disclosure. In some example embodiments, the lighting fixture 100 and/or the light source 104 may have different shapes than shown without departing from the scope of this disclosure. In some example embodiments, another device (e.g., a smart speaker) instead of the lighting fixture 100 may include the integrated microphones and operate in a similar manner as described above with respect to the lighting fixture 100.

Figure 2:
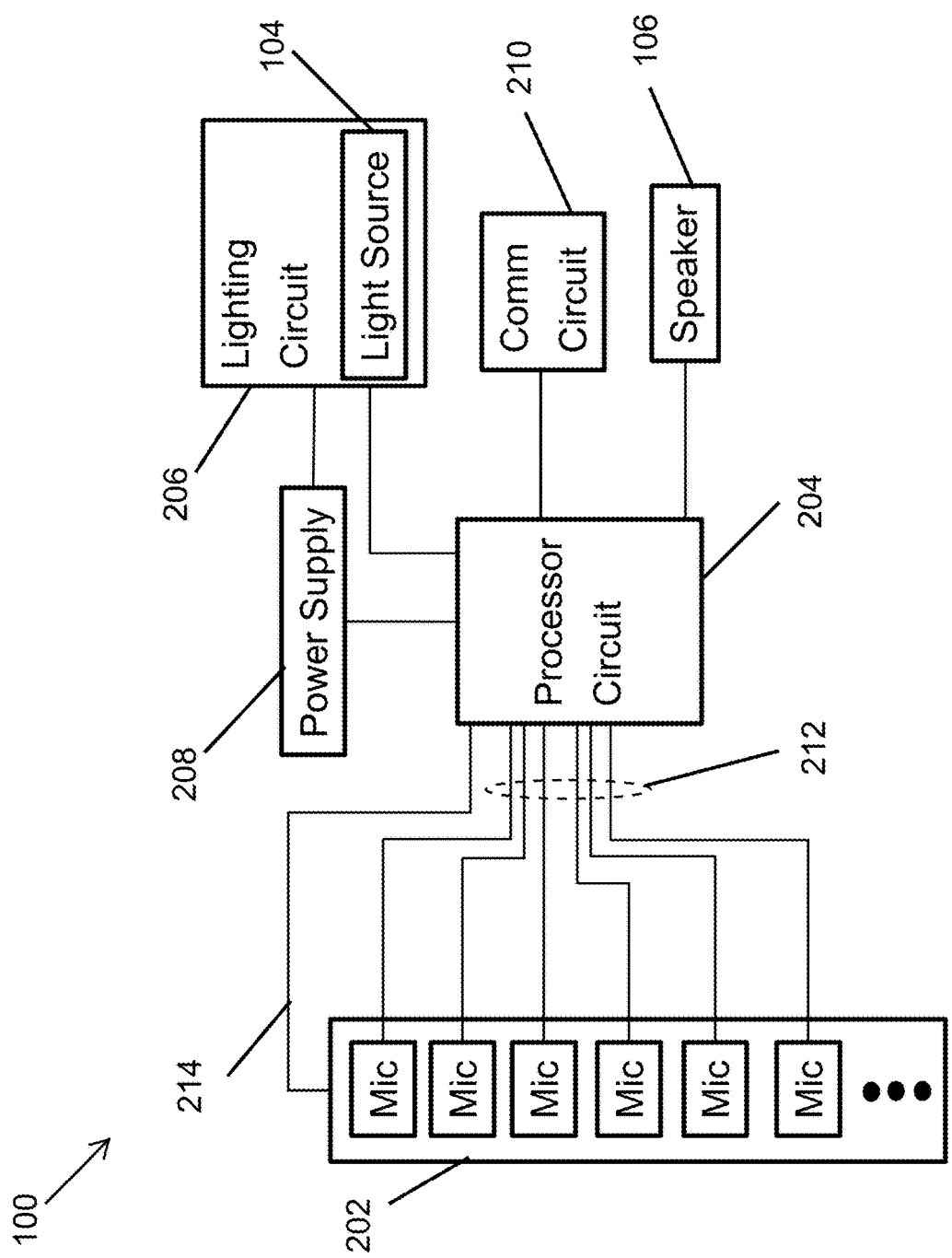
FIG. 2 illustrates a detailed diagram of the lighting fixture of FIG. 1 according to an example embodiment.

FIG. 2 illustrates a detailed diagram of the lighting fixture 100 of FIG. 1 according to an example embodiment. Referring to FIGS. 1 and 2, in some example embodiments, the lighting fixture 100 includes a microphone array 202, a controller or a processor circuit 204, and a lighting circuit 206 including the light source 104. The lighting fixture 100 may also include a power supply 208, a communication circuit 210, and the speaker 106. For example, the power supply 208 may provide power to the processor circuit 204, the lighting circuit 206, and other components of the lighting fixture 100. The microphone array 202 may include the microphones 108-118 that are communicably coupled to the processor circuit 204 via connections 212. The processor circuit 204 may control the lighting circuit 206 to control the illumination light provided by the light source 104. The processor circuit 204 may also control the enabling and disabling of one or more microphones of the microphone array 202 in a similar manner as described above with respect to the microphones 108-118.

In some example embodiments, the processor circuit 204 may receive electrical audio signals from the enabled one or more microphones of the microphone array 202, where the electrical audio signals represent the sounds received by the enabled one or more microphones of the microphone array 202. The processor circuit 204 may process the electrical audio signals and may perform further operations based on the information contained in the electrical audio signals. For example, the processor circuit 204 may control the lighting circuit 206 or perform calibration of the microphone array 202 based on the information contained in the electrical audio signals. The processor circuit 204 may also transmit the information contained in the electrical audio signals via the communication circuit 210. For example, the communication circuit 210 may include a wired and/or a wireless transceiver.

In some example embodiments, the processor circuit 204 may control the speaker 106 to produce sounds. For example, during the calibration of the microphone array 202, the processor circuit 204 may control the speaker 106 to output a sound. The processor circuit 204 may determine whether one or more microphones of the microphone array 202 are defective based on the electrical audio signals that may be generated by the one or more microphones from the sound produced by the speaker 106. The processor circuit 204 may disable one or more defective microphones of the microphone array 202 and enable one or more other microphones of the microphone array 202 as substitutions for defective microphones in a similar manner as described with respect to FIG. 1.

In some example embodiments, regardless of whether any of the microphone array 202 are defective, the processor circuit 204 may identify a set of one or more microphones of the microphone array 202 that provide a satisfactory performance or that provide the best audio performance compared to other sets of microphones of the microphone array 202. For example, the processor circuit 204 may identify a particular set of microphones based on the electrical audio signals that may be generated from the sound received by one or more of the microphones of the microphone array 202. The processor circuit 204 may enable the set of one or more microphones of the microphone array 202 that is identified as providing a satisfactory performance or the best performance. The processor circuit 204 may also disable the set of microphones of the microphone array 202 that were previously in use and that are being replaced by the new set of enabled microphones.

In some example embodiments, the processor circuit 204 may output microphone control (i.e., enable and disable) signals over a connection 214 to enable and disable individual microphones of the microphone array 202 or groups of microphones of the microphone array 202. The connection 214 may include, for example, multiple electrical wires and/or traces. The processor circuit 204 may provide, via the connection 214, microphone control signals to switches (e.g., MOSFETs) that control power, for example, from the power supply 208 to the microphones of the microphone array 202.

In some example embodiments, the processor circuit 204 may provide microphone control signals to switches that control power to components coupled to or included in the microphones instead of or in addition to controlling power to the microphones themselves. To illustrate, the microphones of the microphone array 202 may include pre-amplifiers or other components, and the processor circuit 204 may provide the control signals to control the power provided to the pre-amplifiers or other components. In some example embodiments, the microphones may be digital microphones that are disabled or enabled in response to the microphone control signals from the processor circuit 204. In some alternative embodiments, the processor circuit 204 may enable and disable microphones of the microphone array 202 by other means as may be contemplated by those of ordinary skill in the art with the benefit of this disclosure.

In some alternative embodiments, the lighting fixture 100 may have different components and/or configuration of components than shown without departing from the scope of this disclosure. In some example embodiments, the lighting fixture 100 may include additional electrical connections, such as connections between the power supply and the microphones of the microphone array 202. In some alternative embodiments, some of the components of the lighting fixture 100 may be integrated into a single components without departing from the scope of this disclosure.

Figure 3:
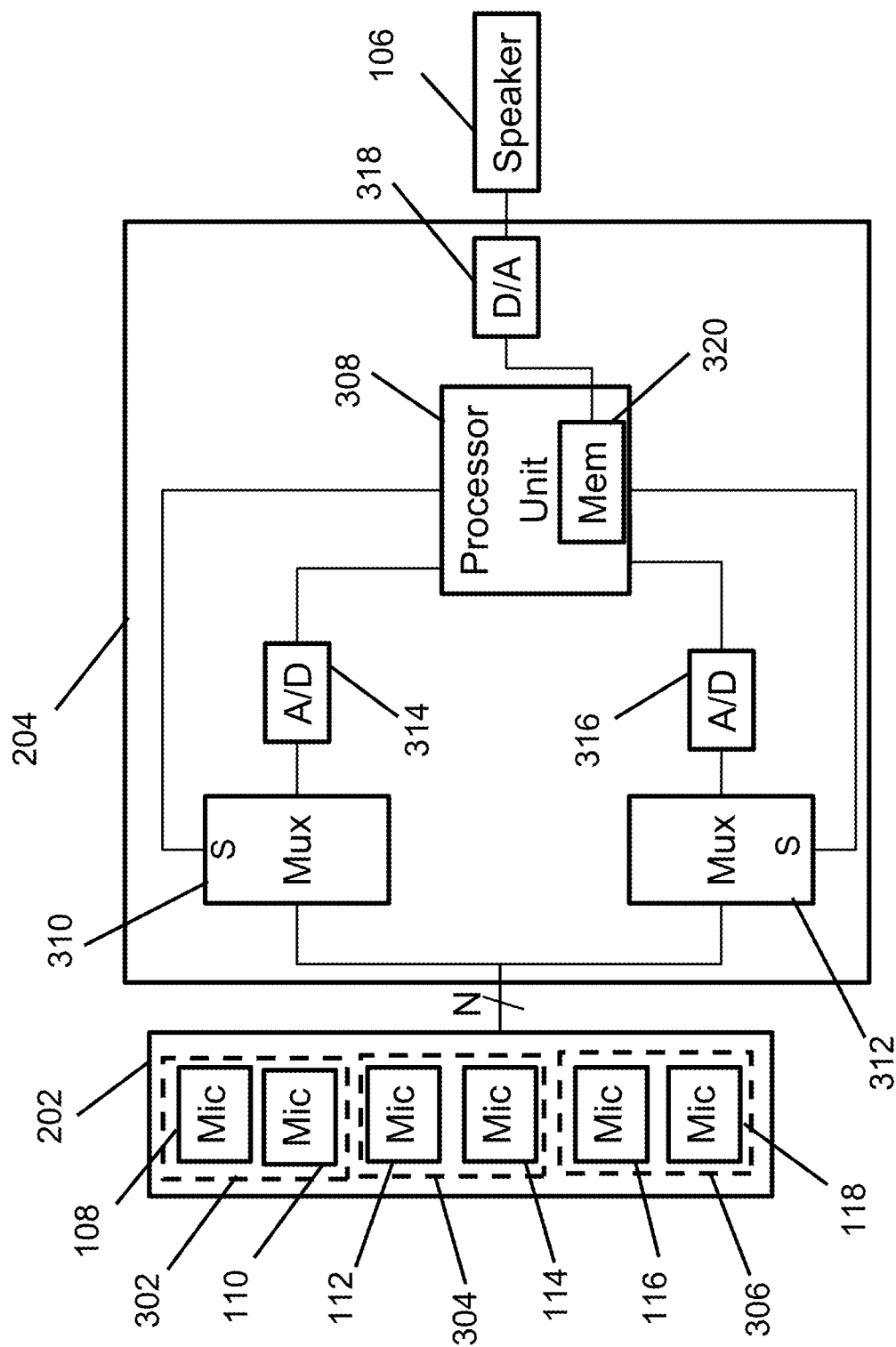
FIG. 3 illustrates another detailed diagram of the lighting fixture of FIG. 1 according to another example embodiment.

FIG. 3 illustrates another detailed diagram of the lighting fixture 100 of FIG. 1 according to an example embodiment. Referring to FIGS. 1-3, in some example embodiments, the lighting fixture 100 may include the microphone array 202 that includes the microphones 108-118 grouped into sets 302, 304, 306. For example, the set 302 may include the microphones 108, 110, the set 304 may include microphones 112, 114, and the set 306 may include the microphone 116, 118.

In some example embodiments, the processor circuit 204 includes a processor unit 308 that may include, for example, a microprocessor or a microcontroller, and a memory device 320. The processor circuit 204 may also include multiplexers 310, 312 that selectively output electrical audio signals received from the microphones of the microphone array 202 or from pre-amplifiers included in or coupled to the microphones of the microphone array 202. For example, each multiplexer 310, 312 may receive N electrical audio signals from the microphones 108-118, where N corresponds to the number of microphones in the microphone array 202. The processor unit 308 may control the multiplexer 310, 312 to select two electrical audio signals corresponding to two microphones of the microphone array 202. Alternatively, the processor circuit 204 may include more than two multiplexers, and processor unit 308 may control the multiplexer to select more than two electrical audio signals corresponding to more than two microphones of the microphone array 202.

In some example embodiments, the selected audio signals may be provided to analog-to-digital converters 314, 316 that generate digital signals that are provided to the processor circuit 204. The processor unit 308 may process the digital signals from the analog-to-digital converters 314, 316, for example, to determine whether microphones that are associated with the digital signals are defective and/or to identify a set of microphones from among the sets 302, 304, 306 that provide a satisfactory performance or the best performance. The processor circuit 204 may control the multiplexer 310, 312 to select electrical audio signals from another two microphones of the microphone array 202 and process the digital signals generated from these electrical audio signals to determine whether the associated microphones are defective and/or provide a satisfactory performance or the best performance.

In some example embodiments, data and executable software code may be stored in the memory device 320. For example, the processor unit 308 may execute the software code stored in the memory device 320 to perform operations described herein. For example, using a digital-to-analog converter 318 and the speaker 106, the processor unit 308 may execute the software code to generate a sound from audio data stored in the memory device 320. The sound produced by the speaker 106 may be used to check for microphones that are defective and/or that provide a satisfactory performance or the best performance. For example, one or more enabled microphones from among the microphones 108-118 may receive the sound and generate corresponding one or more electrical audio signals that are converted to digital signals for processing by the processor unit 308.

To illustrate, to determine whether the microphone 110 is defective based on the sound generated by the speaker 106, the processor unit 308 may enable (if not already enabled) the microphone 110 using a control signal provided via the connection 214 and select, using one of the multiplexers 310, 312, the audio signal from the microphone 110. The processor unit 308 may compare the resulting digital signal from one of the analog-to-digital converters 314, 316 against one or more thresholds or ranges. For example, the processor unit 308 may determine that the microphone 110 is defective if the average voltage level of the electrical audio signal from the microphone 110 (as determined based on the corresponding digital signal) is outside a range of average values. As another example, the processor unit 308 may determine that the microphone 110 is defective if the peak voltage level of the electrical audio signal from the microphone 110 (as determined based on the corresponding digital signal) is above a threshold level.

In some alternative embodiments, the microphones 108-118 may be digital microphones that output digital electrical audio signals, instead of analog audio signals, that are provided to the multiplexer 310, 312. In such embodiments, the analog-to-digital converters 314, 316 may be omitted or unused, and the processor unit 308 may process the selected digital signals from the multiplexer 310, 312, where the processor unit 308 controls the signal selection by the multiplexer 310, 312 as described above.

In some alternative embodiments, the processor unit 308 may determine whether a microphone (e.g., microphone 110) of the microphone array 202 is defective by processing and comparing the analog electrical audio signal from the particular microphone against threshold values or ranges. For example, the processor unit 308 may determine that the microphone 110 is defective if the peak voltage level of the audio signal is above a threshold level, below a threshold level, or outside a range of voltage levels. The processor unit 308 may determine whether one or more other microphones of the array 202 are defective in a similar manner. In some example embodiments, the processor unit 308 may disable a microphone that is found to be defective and enable one or more of the other microphones to functionally replace the defective microphone.

In some alternative embodiments, the lighting fixture 100 may have different components and/or configuration of components than shown without departing from the scope of this disclosure. In some alternative embodiments, one or more components of the lighting fixture 100 may be omitted without departing from the scope of this disclosure. In some alternative embodiments, the array 202 may include more or fewer microphones, and each set 302, 304, 306 may include fewer or more microphones.

Figure 4:
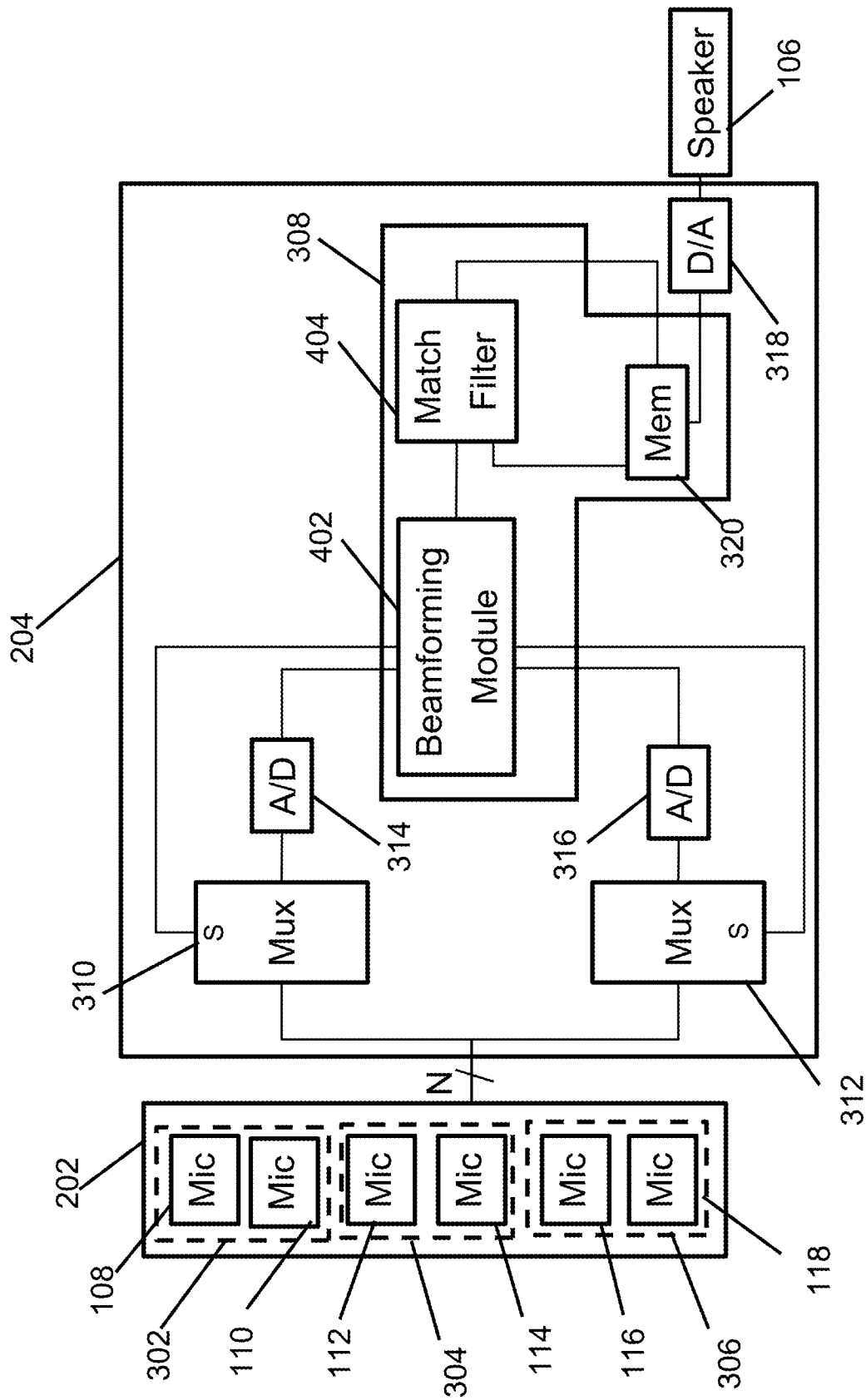
FIG. 4 illustrates another detailed diagram of the lighting fixture of FIG. 1 according to another example embodiment.

FIG. 4 illustrates another detailed diagram of the lighting fixture 100 of FIG. 1 according to an example embodiment. Referring to FIGS. 1-4, in some example embodiments, the processor unit 308 may process the digital signals from the analog-to-digital converters 314, 316 to identify a set of microphones from among the sets 302, 304, 306 that provide a satisfactory performance (i.e., meet or exceed a performance threshold) or the best performance. For example, the processor unit 308 may select electrical audio signals from the microphones 108, 110 of the set 302 using the multiplexer 310, 312. A beamforming module 402 (e.g., a software, a hardware, or a combination) of the processor unit 308 may perform beamforming using the digital signals from the analog-to-digital converters 314, 316 corresponding to the audio signals from the microphones 108, 110 of the set 302. For example, the beamforming module 402 may perform filtering and combining of multiple signals to extract the desired signal and reject unwanted signals as can be readily understood by those of ordinary skill in the art with the benefit of this disclosure.

In some example embodiments, the microphones of the 302, 304, 306 may be digital microphones, and the analog-to-digital converters 314, 316 may be omitted. For example, the processor unit 308 may select digital electrical audio signals from the microphones 108, 110 of the set 302 using the multiplexer 310, 312. To illustrate, the beamforming module 402 of the processor unit 308 may perform beamforming using the digital audio signals from the microphones 108, 110 of the set 302 provided by the multiplexer 310, 312 based on the selection by the processor unit 308.

In some example embodiments, the processor unit 308 may include a match filtering module 404 (e.g., a software, a hardware, or a combination thereof) that performs match filtering using the output signal of the beamforming module 402 and a signal generated from the audio data in the memory device 320, where the audio data is used to generate, via the speaker 106, the sound received by the microphones 108, 110 of the set 302. For example, the match filtering module 404 may compute the mean square error (MSE) value between the output signal of the beamforming module 402 and the signal generated from the audio data. The processor unit 308 may compare the MSE value corresponding to the microphones 108, 110 of the set 302 to a threshold MSE value to determine whether the microphones 108, 110 have a satisfactory audio performance. For example, the processor unit 308 may determine that the microphones 108, 110 of the set 302 have a satisfactory audio performance (i.e., meet or exceed an audio performance threshold) if the corresponding MSE value is at or below a threshold MSE value. The processor unit 308 may determine whether the microphones of the sets 304, 306 have a satisfactory performance in a similar manner as described with respect to the microphones 108, 110. In some example embodiments, the match filtering module 404 may compute a correlation value between the output signal of the beamforming module 402 and the signal generated from the audio data. The processor unit 308 may compare the correlation value corresponding to the microphones 108, 110 of the set 302 to a threshold correlation value to determine whether the microphones 108, 110 have a satisfactory audio performance. For example, a correlation value that is above the threshold correlation value (e.g., 0.5, 0.6, or 0.8 on a scale between 0 and 1,) may be considered satisfactory. The threshold correlation value may be set based on a specific application and the level of desired audio performance.

In some example embodiments, the processor unit 308 may enable the microphones of the set that the processor unit 308 determines first as having a satisfactory performance and disable the microphones of the other sets. For example, after determining that the microphones of a particular set have a satisfactory performance, the processor unit 308 may not check whether other sets of microphones of the array 202 have a satisfactory performance. Alternatively, the processor unit 308 may compare the MSE values or correlation values corresponding to the sets 302, 304, 306 against each other to identify the set that has the best performance (i.e., lowest MSE or highest correlation value). The processor unit 308 may enable the microphones of the set that the processor unit 308 determines has the best performance and disable the microphones of the other sets.

In some alternative embodiments, the lighting fixture 100 may have different components and/or configuration of components than shown without departing from the scope of this disclosure. In some alternative embodiments, the array 202 may include more or fewer microphones, and each set 302, 304, 306 may include fewer or more microphones.

Figure 5:
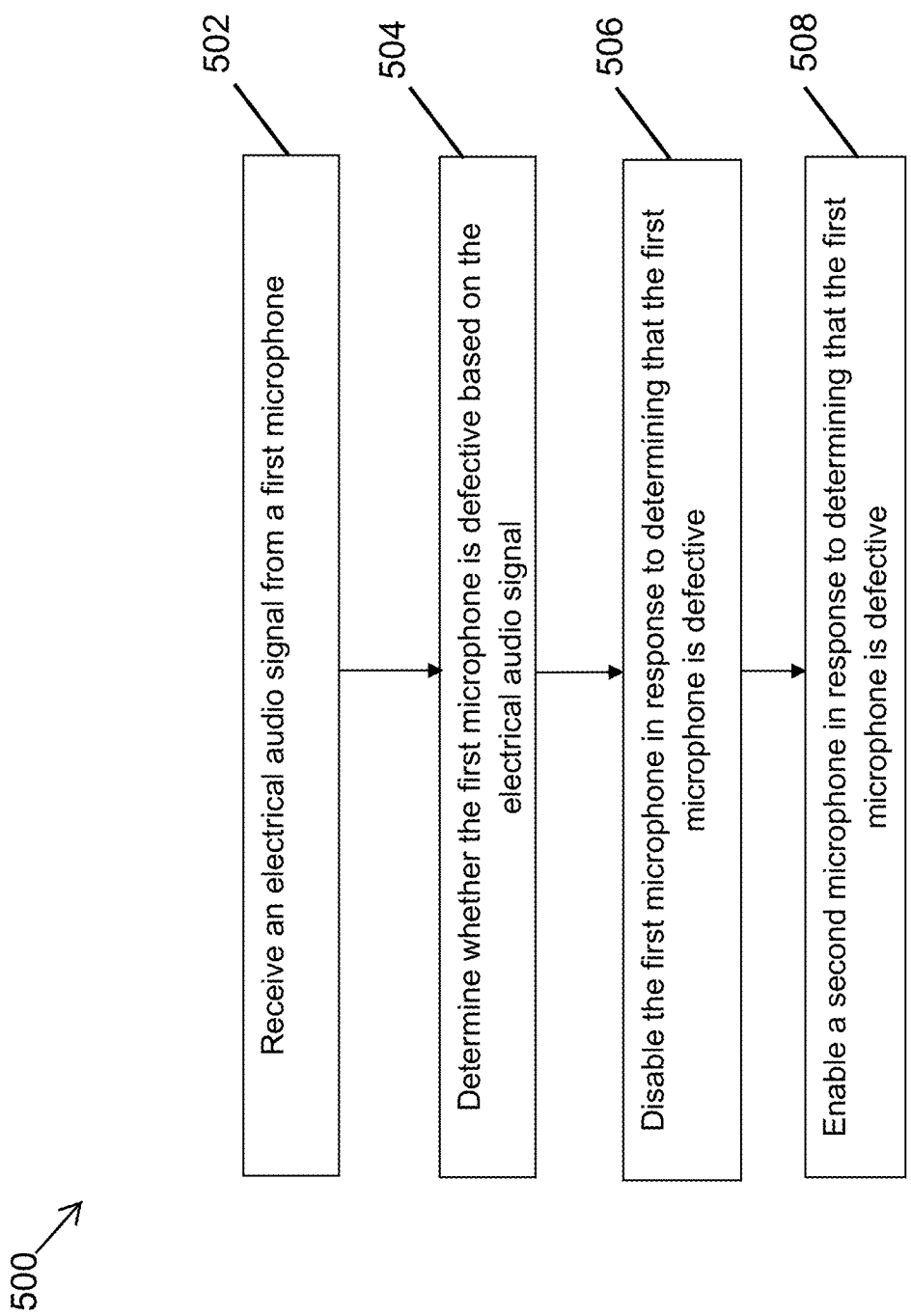
FIG. 5 illustrates a method of configuring lighting fixture microphones of a lighting fixture according to another example embodiment.

FIG. 5 illustrates a method 500 of configuring lighting fixture microphones according to another example embodiment. In some example embodiments, the method 500 may be performed to identify and functionally replace defective microphones. Referring to FIGS. 1-5, in some example embodiments, the method 500 includes at step 502, receiving, by the processor circuit 204, an electrical audio signal from a first microphone (e.g., the microphone 118). For example, the method 500 may include enabling the first microphone (e.g., the microphone 118) so that the first microphone generates an electrical audio signal based on a received sound. In some alternative embodiments, the first microphone may have been previously enabled by the processor circuit 204. The processor circuit 204 may use the speaker 106 to produce the sound received by the first microphone based on the audio data stored in the memory device 320.

In some example embodiments, at step 504, the method 500 includes determining, by the processor circuit 204, whether the first microphone is defective based on the electrical audio signal. For example, the processor circuit 204 may determine whether the first microphone (e.g., the microphone 118) is defective based on the peak voltage of the electrical audio signal and/or based on the average voltage of the electrical audio signal. For example, the first microphone may be considered as defective if the peak voltage of the electrical audio signal from the first microphone is above a particular threshold level. As another example, the first microphone may be considered as defective if the average voltage of the electrical audio signal from the first microphone is outside of a range of voltage values.

In some example embodiments, at step 506, the method 500 includes disabling, by the processor circuit 204, the first microphone in response to determining that the first microphone is defective. At step 508, the method 500 includes enabling, by the processor circuit 204, a second microphone (e.g., the microphone 112) in response to determining that the first microphone is defective. In some example embodiments, the processor circuit 204 determines that the second microphone is separated from other one or more enabled microphones of the lighting fixture 100 by at least a minimum separation requirement/a threshold distance (e.g., half a wavelength of an audio signal) before enabling the second microphone.

In some example embodiments, the method 500 may include, after enabling the second microphone, determining, by the processor circuit 204, whether the second microphone is defective based on an electrical audio signal from the second microphone. For example, the processor circuit 204 may determine whether the second microphone is defective based on the peak voltage of the electrical audio signal from the second microphone and/or based on the average voltage of the electrical audio signal from the second microphone. If the second microphone is not defective (i.e., meets a performance requirement or threshold), the second microphone may remain enabled and may be used as a functional replacement for the first microphone. If the second microphone is defective, the processor circuit 204 may disable the second microphone and enable a third microphone. The processor circuit 204 may determine whether the third microphone is defective and continue the process to find a microphone from the microphones of the lighting fixture 100 that can be used as a substitute microphone for the first microphone if the first microphone is defective.

In some example embodiments, the method 500 may also include generating, by the speaker 106, a sound, where the electrical audio signal from the first microphone is generated by the first microphone from the sound. For example, the processor circuit 204 may control the generation of the sound by the speaker 106 based on audio data stored in the memory device 320. Other electrical signals from other microphones of the lighting fixture 100 may also be generated from a sound produced by the speaker 106 based on, for example, the audio data stored in the memory device 320.

In some example embodiments, the method 500 may be performed in response to a calibration request or command received by the processor circuit 204. For example, the calibration request or command may be received via the communication circuit 210. Alternatively or in addition to a calibration request/command, the method 500 may be performed periodically based on the configuration of the processor circuit 204.

In some alternative embodiments, the method 500 may include more or fewer steps than described above without departing from the scope of this disclosure. In some example embodiments, some of the steps of the method 500 may be performed in a different order than described above.

Figure 6:
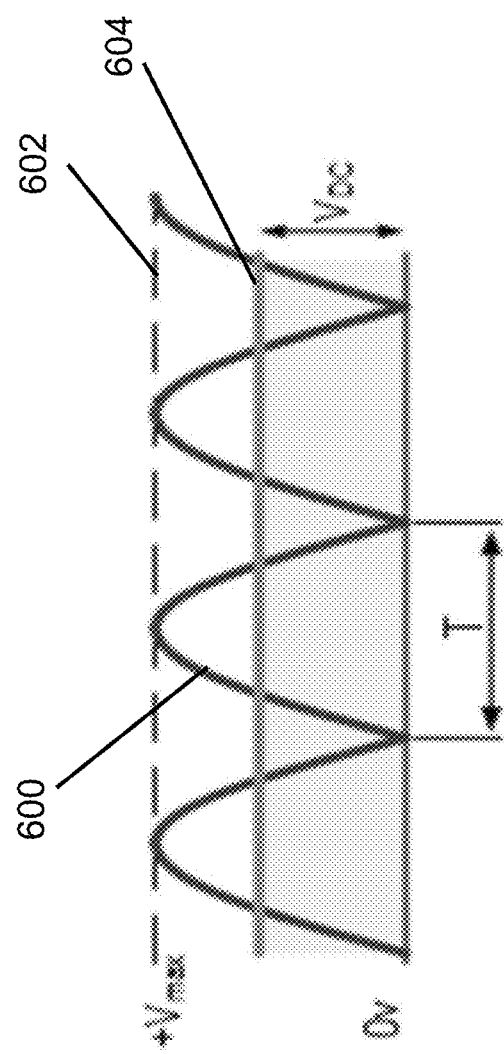
FIG. 6 illustrates an electrical signal and characteristics of the signal that may be used to identify a defective microphone according to an example embodiment.

FIG. 6 illustrates an electrical signal 600 and characteristics of the signal that may be used to identify a defective microphone according to an example embodiment. For example, the maximum voltage level 602 and the average voltage level 604 may be used to determine whether a microphone is defective as described above.

Figure 7:
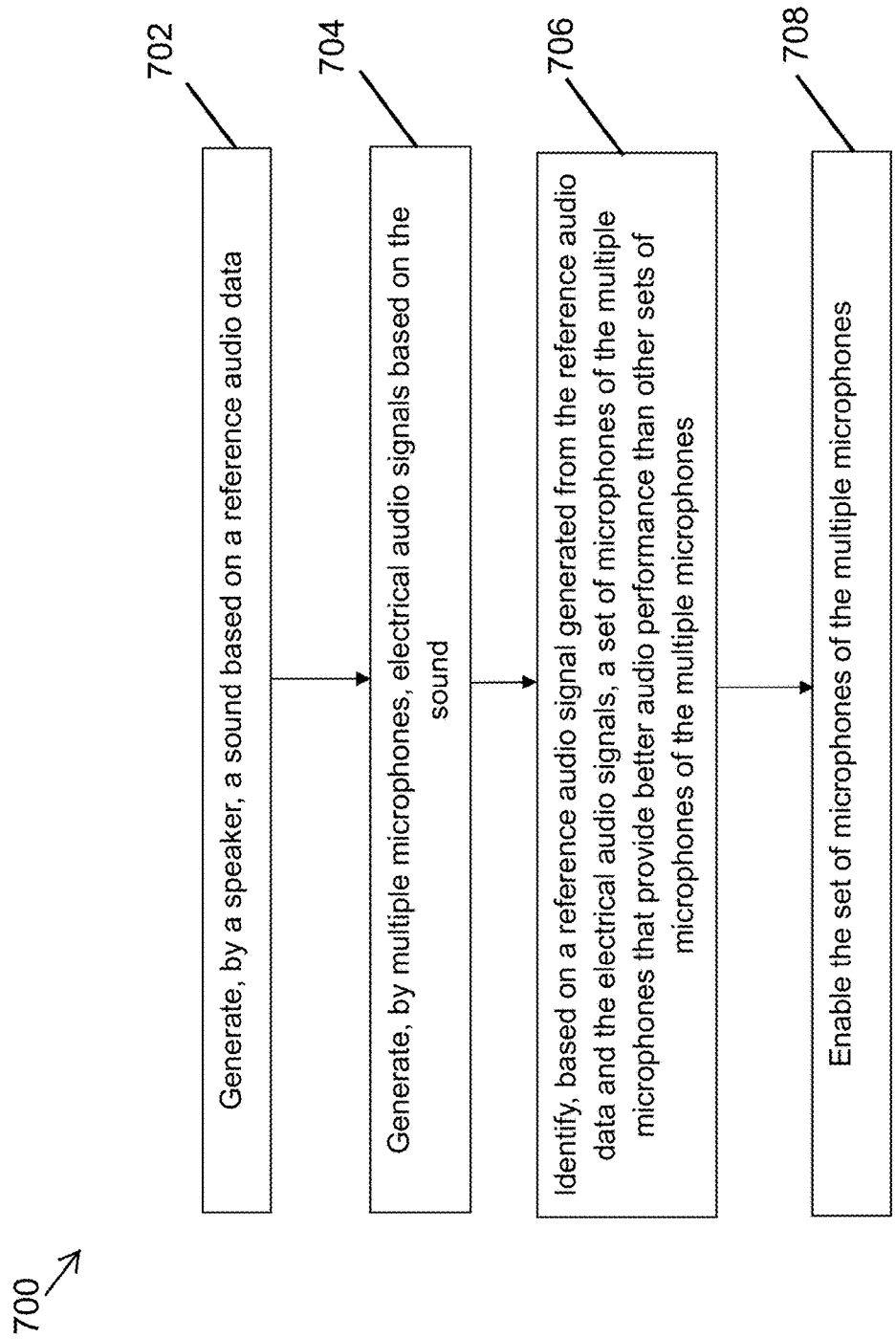
FIG. 7 illustrates a method of configuring lighting fixture microphones according to another example embodiment.

FIG. 7 illustrates a method 700 of configuring lighting fixture microphones according to another example embodiment. Referring to FIGS. 1-4, 6, and 7, in some example embodiments, the method 700 includes, at step 702, generating, by the speaker 106, a sound based on a reference audio data. For example, the processor circuit 204 may control the generation of the sound by the speaker 106 based on audio data stored in the memory device 320. At step 704, the method 700 may include generating, by multiple microphones (e.g., some or all of the microphones 108-118), electrical audio signals based on the sound. For example, the microphones in the sets 302, 304, 306 of microphones may generate electrical audio signals at the same time or at different times.

In some example embodiments, at step 706, the method 700 includes identifying, by the processor circuit 204, based on a reference audio signal generated from the reference audio data and based on the electrical audio signals, a set of microphones of the multiple microphones that provide better audio performance than other sets of microphones of the multiple microphones. For example, the processor circuit 204 may identify one or more microphones that provide a better audio performance than other one or more microphones.

For example, the processor circuit 204 may determine that the set 302 of the microphones 108, 110 provide better audio performance than other sets 304, 306 based on the MSE values or correlation values computed relative to the reference electrical audio signal generated from the audio data stored in the memory 320 and used to output the sound by the speaker 106. As described above with respect to FIG. 4, for each set 302, 304, 306, the processor circuit 204 may compute the MSE or correlation value between a signal resulting from the electrical audio signals from the respective microphones and the reference electrical audio signal.

For example, the processor circuit 204 may determine that the set of microphones associated with the lowest MSE or highest correlation value provides better audio performance than the other sets of microphones.

In some example embodiments, at step 708, the method 700 includes enabling, by the processor circuit 204, the set of microphones (e.g., the set 302 that includes the microphones 108, 110), for example, by turning on one or more switches that control power to the set of microphones. The method 700 may also include disabling the other sets of microphones, for example, in response to determining that another set of microphones provides a better audio performance. The method 700 may be performed in response to a calibration request received by the processor circuit 204. Alternatively or in addition, the method 700 may be performed periodically based on the configuration of the processor circuit 204. In some example embodiments, the processor circuit 204 may be provided or programmed with information indicating the grouping of the microphones 108-118 into the sets 302, 304, 306. In some example embodiments, the processor circuit 204 may exclude sets of microphones that have one or more defective microphones from the comparison to determine the best performing sets of microphones.

In some example embodiments, the method 700 may include identifying, by the processor circuit 204, based on the electrical audio signals, one or more microphones or a set of the microphones from among the microphones 108-118 that meet an audio performance threshold (e.g., at or below a threshold MSE value, within a range of peak voltage values, etc.). For example, if a particular set of two or three microphones meet an audio performance threshold, the processor circuit 204 may enable the particular set of microphones and disable remaining microphones.

In some alternative embodiments, the method 700 may include more or fewer steps than described above without departing from the scope of this disclosure. In some example embodiments, some of the steps of the method 700 may be performed in a different order than described above.

Although particular embodiments have been described herein in detail, the descriptions are by way of example. The features of the example embodiments described herein are representative and, in alternative embodiments, certain features, elements, and/or steps may be added or omitted. Additionally, modifications to aspects of the example embodiments described herein may be made by those skilled in the art without departing from the spirit and scope of the following claims, the scope of which are to be accorded the broadest interpretation so as to encompass modifications and equivalent structures.

What is claimed is:

1. A method of configuring microphones of a lighting fixture, the method comprising: receiving, by a processor circuit, an electrical audio signal from a first microphone of the microphones; determining, by the processor circuit, whether the first microphone is defective based on the electrical audio signal; and enabling, by the processor circuit, a second microphone of the microphones in response to determining that the first microphone is defective and the second microphone being separated from a third microphone of the microphones by a minimum threshold distance, wherein the third microphone is already enabled when the processor circuit enables the second microphone, and wherein the processor circuit is configured to disable the second microphone in response to determining that the second microphone is defective after enabling the second microphone.

2. The method of claim 1, further comprising disabling, by the processor circuit, the first microphone in response to determining that the first microphone is defective.

3. The method of claim 1, further comprising enabling, by the processor circuit, the first microphone before determining whether the first microphone is defective.

4. The method of claim 1, further comprising generating, by a speaker of the lighting fixture, a sound, where the electrical audio signal is generated by the microphone based on the sound.

5. The method of claim 1, further comprising determining, by the processor circuit, whether the second microphone is defective based on a second electrical audio signal from the second microphone.

6. The method of claim 1, wherein the processor circuit is configured to determine whether the first microphone is defective based on a peak voltage of the electrical audio signal.

7. The method of claim 1, wherein the processor circuit is configured to determine whether the first microphone is defective based on an average voltage of the electrical audio signal.

8. The method of claim 1, wherein the processor circuit is configured to determine whether the first microphone is defective in response to a calibration request received by the lighting fixture.

9. The method of claim 1, wherein the processor circuit is configured to periodically determine whether first microphone is defective.

10. A lighting fixture, comprising: a light source that provides an illumination light; multiple microphones; and a processor circuit configured to: control operations of the light source; determine whether a first microphone of the multiple microphones is defective; enable a second microphone of the multiple microphones in response to determining that the first microphone is defective and the second microphone being separated from a third microphone of the microphones by a minimum threshold distance, wherein the third microphone is already enabled when the processor circuit enables the second microphone: and disable the second microphone in response to determining that the second microphone is defective after enabling the second microphone.

11. The lighting fixture of claim 10, wherein the processor circuit is configured to disable the first microphone in response to determining that the first microphone is defective.

12. The lighting fixture of claim 10, further comprising a speaker, wherein the processor circuit is configured to determine whether a first microphone of the multiple microphones is defective based on a sound produced by the speaker and received by the microphone.

13. The lighting fixture of claim 10, wherein the processor circuit is configured to determine whether the first microphone is defective in response to a calibration request received by the lighting fixture.

* * * * *